March 8, 1932.    J. C. BERGNER    1,849,031
ALIMENT FORMING DEVICE
Filed June 16, 1928
FIG. I.
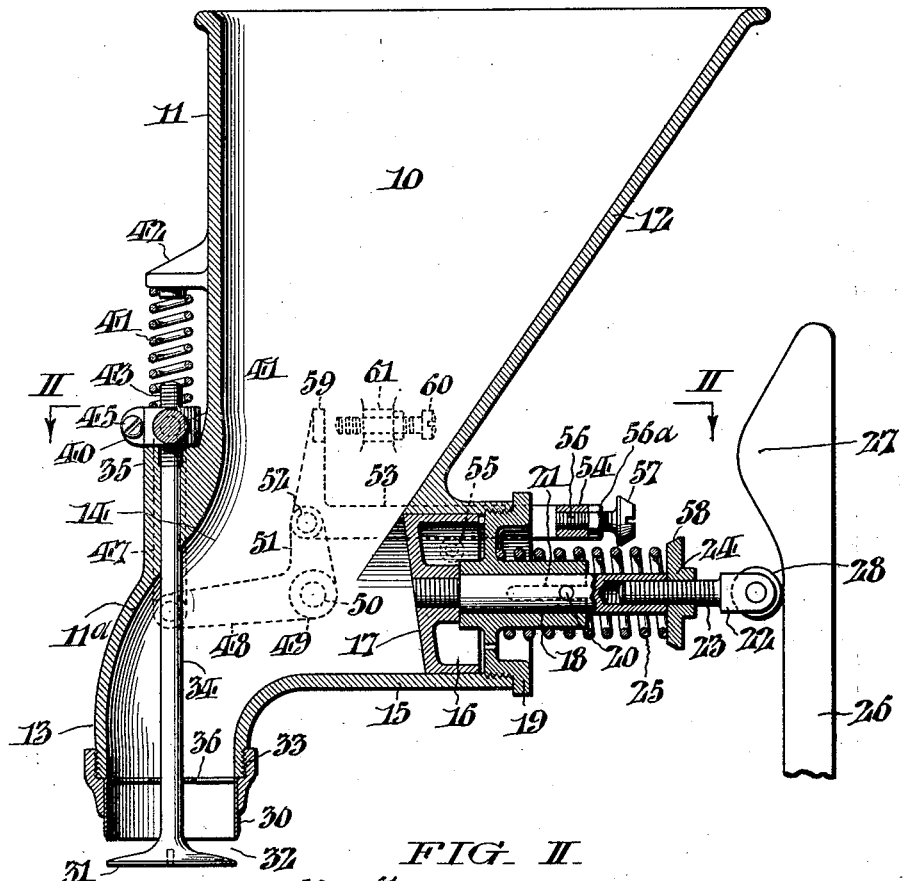
FIG. II.
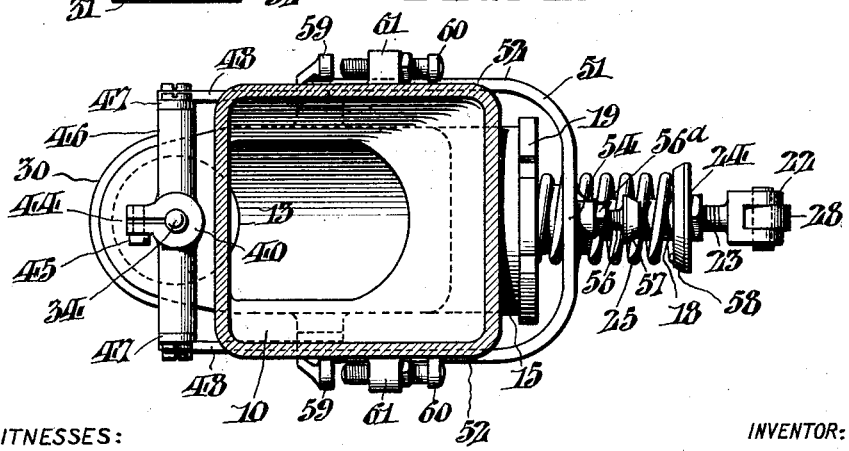
WITNESSES:
Thomas W. Kerr, Jr.
William Bell
INVENTOR:
John C. Bergner,
BY Fraley & Paul
ATTORNEYS.

Patented Mar. 8, 1932

1,849,031

UNITED STATES PATENT OFFICE

JOHN C. BERGNER, OF LANSDOWNE, PENNSYLVANIA, ASSIGNOR TO DOUGHNUT MACHINE CORPORATION, OF NEW YORK, N. Y., A CORPORATION OF NEW YORK

ALIMENT FORMING DEVICE

Application filed June 16, 1928. Serial No. 285,870.

This invention relates to devices for forming alimentary products from plastic material, for example, articles of pastry like doughnuts or crullers from prepared dough.

The main object of my invention is to provide a forming device which is extremely simple in operation; so constructed as to be easily disassembled for cleaning; and capable of producing articles of the kind referred to with assurance of uniformity as to size and configuration, in rapid succession and under absolutely sanitary conditions.

Other objects and attendant advantages will be manifest from the appended detailed description of the typical embodiment of this invention shown in the drawings, whereof Fig. I is a longitudinal sectional view of my improved forming device; and Fig. II is a plan section taken as indicated by the arrows II—II in Fig. I.

As herein delineated the forming device comprises a gravity hopper 10 for the plastic or dough, which hopper may be square in cross section as shown in Fig. II. The front wall 11 of the hopper is for the most part, vertical; while its rear wall 12 is inclined for capacity to divert the flow of the plastic forwardly or in the direction of an axially offset downwardly directed outlet 13. This outlet is integral with the hopper and communicates therewith by way of a merging connecting neck 14. In a horizontal cylindrical offset 15 of the hopper 10, at the level or region of the neck 14, operates a laterally reciprocating piston plunger 16 whereof the forward face 17 is inclined counter to the slope of the frontal hopper wall 11 at 11a, so that, as said plunger moves forward to the dot and dash line position in Fig. I, a definite quantity or unit portion of the plastic is displaced from the hopper proper downward into the outlet 13. The stem 18 of the plunger 16 has bearing in a cap piece 19 screwed into the open-end of the offset 15, and is prevented from rotating through sliding engagement of a pin 20 thereon in a longitudinal slot 21 in the bearing. An extension piece 22 with a threaded shank 23 takes axially into the posterior end of the plunger stem 18, and is secured against shifting in adjusted positions by a collar 24 that acts after the manner of a jamb nut. As shown in Fig. I, the collar 24 is circumferentially extended or flanged to function in the added capacity of an out-board abutment for a helical compression spring 25 which is retroactive upon the plunger 16. The plunger may be moved by hand; or when the forming device is to be driven under power, the plunger may be actuated by a vertically reciprocating rod such as shown at 26 in Fig. I, said rod having a lateral cam projection 27 to cooperate with a roller 28 at the end of the plunger rod extension 22. With the described or an equivalent arrangement, the device is adaptable to automatic cooking apparatus such as disclosed in Patents Nos. 1,492,541 and 1,492,542 granted me under date of April 29, 1924.

To enable production of annular formations I provide means including a pair of cooperating cutter elements, to wit, a sleeve 30 and a co-axial disk 31, which jointly provide a normally open annular die opening 32 at the lower end of the outlet 13. In the present instance, the sleeve 30 constitutes an extension of the outlet 13, and is removably secured to the latter by screw engagement as at 33. The disk 31 has an upward axial stem 34 with guidance at the top in a bearing 35 afforded by the hopper structure, and near the lower end centrally of a foraminous diaphragm 36 spanning the sleeve 30. The cutter disk 31 is intermittently operated with respect to the active or inward strokes of the plunger 16 by instrumentalities as follows: Secured to the protruding upper end of the stem 34 is a collar 40 that normally rests in contact with the top of the bearing 35, said collar being held in this position by a helical compression spring 41, which, at its upper end, abuts an overhanging lug 42 projecting outward from the frontal wall 11 of the hopper. The connection between the collar 40 and the stem 34 is a threaded one as shown at 43, to permit adjustment of the disk 31 vertically relative to the lower cutting edge of the sleeve 30 and thereby to vary the width of the annular die outlet. To insure against disturbance after adjustment, the collar 40 is split as at 44 and clampable on the stem by a screw 45. Arms 46 extending laterally outward from opposite sides of the collar 40 are connected, by drop links 47, to horizontal arms 48 of bell crank levers 49 with fulcrum bearing at 50 on the hopper structure. The vertical arms 51 of the bell crank levers 49 in turn have pivotal connection at 52 with forwardly extending side arms 53 of a yoke piece 54. Beyond the pivotal connections 52, the yoke piece 54 rests on rollers 55 at the sides of the offset 14 so as to be normally sustained in horizontal position as illustrated in Fig. I. Adjustably set at the center of the cross bar of the yoke 51 is a screw 56 that has a beveled head 57 to cooperate with the flanged collar 24 on the plunger rod 22, said collar being also peripherally beveled as shown for a purpose later on explained. The side arms 52 of the yoke piece 51 have upwardly directed extremities 59 adapted to contact with regulatable stop screws 60 engaged in lugs 61 at the sides of the hopper.

The operation of my forming device is as follows: As the actuating rod 26 moves downward from the position shown, the leading inclined edge of the cam projection 27—in cooperating with the roller 28—causes the plunger 16 to be moved inward to the dot and dash line position of Fig. I, this action being attended by displacement of a unit portion of the plastic from the hopper 10 as previously explained. Incidentally to the inward stroke of the plunger, the bevel of the collar 24 engages with the corresponding bevel of the screw 56 on the yoke piece 54 as a consequence of which the latter is idly swung upward about the pivot centers 52. Upon movement of the upper receding incline edge of the projection 27 of the rod 26 during continued downward travel past the roller 28, the plunger 16 is gradually moved outward by the spring 25. At this time however, positive inter-engagement takes place between the collar 58 and the headed screw 56 such that the yoke piece 54 is drawn rearward with impartation of movement to the bell crank levers 49. This results in raising of the disk 31 into the sleeve 30 and severance of a unit portion of plastic extruded through the annular die outlet 13 by the preceding inward movement of the plunger. However, before the plunger 16 has completed its full return stroke, the upward extremities 59 of the yoke piece 54 encounter the stop screws 60 whereby said yoke piece is tripped, or in other words, swung upwardly about the pivot centers 52 with attendant lifting and disconnection of the screw head 57 from the collar 24. The disk 31 is accordingly released to the action of the spring 41 so that the die outlet 32 is instantly opened to permit extrusion of the dough therethrough concurrently with the next forward movement of the plunger. Direct gravitation of dough through the die opening 32 is precluded through axial offsetting of the outlet 13 relative to the hopper 10 as herein shown, the dough being therefore under perfect control and subject to displacement by the plunger 17 in the manner described.

Obviously the quantity of the unit portions of plastic discharged through the annular die outlet 32 under the action of the plunger 16 can be varied by adjusting the extension 22 relative to the stem 21 which results in moving the roller 28 toward or away from the rod 26 and correspondingly limiting the influence of the cam projection 27. Such adjustment is readily effected simply by backing off the collar 24, rotating the extension 22 one or more turns in one direction or the other, and thereupon re-tightening said collar. Compensative adjustment of the screw 56 can be made in a like manner by backing off the jamb nut 56a associated therewith, rotating said screw, and re-tightening the jamb nut.

It is to be particularly noted that the plunger assemblage including the plunger 16, the rod or stem 18 together with its other appendages and the spring 25, is removable as a unit, with the cap piece 19, from the hopper, and furthermore that this may be accomplished without disturbing the adjustment of the rod extension 23. The various parts of the assemblage just described are thus made readily accessible for cleaning without necessity for further dismantling, and ready access is afforded to the interior of the hopper through the lateral offset 15 to facilitate removal of any clinging plastic from the walls. By virtue of the detachability of the sleeve 30 and the cutter disk 31, the interior of the outlet 13 is likewise made readily accessible for cleaning. Through these provisions, the device can be at all times maintained in an absolutely sanitary condition with very little care or effort on the part of an operative.

Having thus described my invention, I claim:

1. A forming device of the character described comprising a gravity feed hopper, for plastic material, said hopper having an axially-offset downwardly-discharging die outlet, a laterally reciprocating plunger intermediate the hopper and the die outlet to downwardly displace unit portions of the plastic for discharge through the die outlet, cutter means associated with the die outlet, and means actuated by the plunger incidentally to its rearward or idle stroke for operating the cutter means to temporarily close the die outlet and sever unit extrusions of the plastic.

2. A forming device of the character described comprising a gravity feed hopper for plastic material, said hopper having an axially-offset downwardly-discharging die outlet, a laterally reciprocating plunger intermediate the hopper and the die outlet to displace unit portions of the plastic for discharge through the die outlet, cutter means normally positioned with the die outlet open and so held under the pressure of a spring, means to reciprocate the plunger and means actuated by the plunger incidentally to its backward or idle stroke to move the cutter means in opposition to the spring and thereby effect closure of the die outlet and severance of unit extrusions of the plastic.

3. A forming device of the character described comprising a gravity feed hopper for plastic material, said hopper having an axially-offset downwardly-discharging die outlet, a laterally-reciprocating plunger intermediate the hopper and the die outlet to displace unit portions of the plastic for discharge through the die outlet, cutter means normally positioned with the die outlet open and so held under the pressure of a spring, means to reciprocate the plunger, connecting means engaged by the plunger incidentally to its backward or idle stroke to move the cutter and thereby to close the die outlet and sever unit extrusions of the plastic, and means to automatically trip the connecting means to permit the spring to restore the cutter means to the normal open position with the die outlet open.

4. In a device for forming doughnuts and the like, a dough hopper having a continuously communicating downwardly discharging bottom forming die outlet axially offset to prevent direct gravitation therethrough of dough from the hopper; and a laterally reciprocating means intermediate the hopper and the die outlet to assist in displacing dough from the hopper through the said die outlet.

5. In a device for forming doughnuts and the like, a dough hopper mergent, through a connecting bend, with a continuously communicating downwardly discharging bottom forming die outlet axially offset to prevent direct gravitation therethrough of dough from the hopper; and laterally reciprocating means at the region of the connecting bend to assist in displacing dough from the hopper through the said die outlet.

6. In a device for forming doughnuts and the like, a dough hopper mergent, through a connecting bend, with a downwardly discharging bottom die outlet axially offset to prevent direct gravitation therethrough of dough from the hopper; and a laterally reciprocating plunger at the region of the bend, the said plunger having its face inclined forwardly to co-act with an oppositely sloped portion of the bend in assisting to downwardly displace the dough from the hopper through the die outlet.

7. In a device for forming doughnuts and the like, a dough hopper having a continuously communicating bottom die outlet axially offset to prevent direct gravitation therethrough of dough from the hopper, a laterally reciprocating plunger intermediate the hopper and the outlet to assist in downwardly displacing unit portions of the dough through the die outlet; intermittently operating cutter means to close the die outlet and thereby sever the unit extrusions of the dough; and means to actuate the cutter means in alternation with the plunger.

8. In a device for forming doughnuts and the like, a dough hopper having a continuously communicating downwardly discharging bottom die outlet axially offset to prevent direct gravitation therethrough of dough from the hopper; a laterally reciprocating spring retracted plunger intermediate the hopper and the die outlet; and means for advancing the plunger in opposition to the spring to assist in the displacement of unit portions of dough from the hopper through the die outlet.

9. In a device for forming doughnuts and the like, a dough hopper having a continuously communicating downwardly discharging die outlet axially offset to prevent direct gravitation therethrough of dough from the hopper; a laterally reciprocating spring retracted plunger intermediate the hopper and the die outlet; and cam means reciprocating at right angles to the plunger for advancing the latter in opposition to the spring, thereby to assist in the displacement of unit portions of the dough from the hopper through the die outlet.

10. In a device for forming doughnuts and the like, a dough hopper having a continuously communicating downwardly discharging die outlet axially offset to preclude direct gravitation therethrough of dough from the hopper; a laterally reciprocating spring retracted plunger with an operating rod intermediate the hopper and the die outlet; and cam means for engaging the rod of the plunger to advance the latter in opposition to a spring and thereby to assist in the displacement of unit portions of the dough from the hopper through the die outlet, the said plunger rod having an end extension capable of adjustment toward and away from the cam means to vary the throw of the plunger and the quantity in the unit portions of the dough disposed thereby.

11. In a device for forming doughnuts and the like, a dough hopper with a continuously communicating downwardly discharging die outlet axially offset to prevent direct gravitation therethrough of dough from the hopper; a laterally reciprocating means intermediate the hopper and the die outlet to assist in displacing dough from the hopper through the die outlet, and means whereby the laterally reciprocating means may be regulated to vary the amount of dough discharged through the die outlet at each actuation.

12. In a device for forming doughnuts and the like, a dough hopper with a downwardly discharging die outlet axially offset to prevent direct gravitation therethrough of dough from the hopper; a laterally reciprocating plunger intermediate the hopper and the die outlet to assist in downwardly displacing unit portions of the dough through the die outlet; means whereby the movement of the plunger may be regulated to vary the unit portions discharged through the die outlet at each actuation; intermittently operating cutter means to close the die outlet and sever unit extrusions of the dough; and means to actuate the cutter means in alternation with the plunger.

In testimony whereof, I have hereunto signed my name at Philadelphia, Pennsylvania, this 14th day of June, 1928.

JOHN C. BERGNER.